March 28, 1961   N. B. BROGAN ET AL   2,976,728
ELECTROLYTIC MOISTURE MEASURING APPARATUS
Filed Jan. 20, 1958
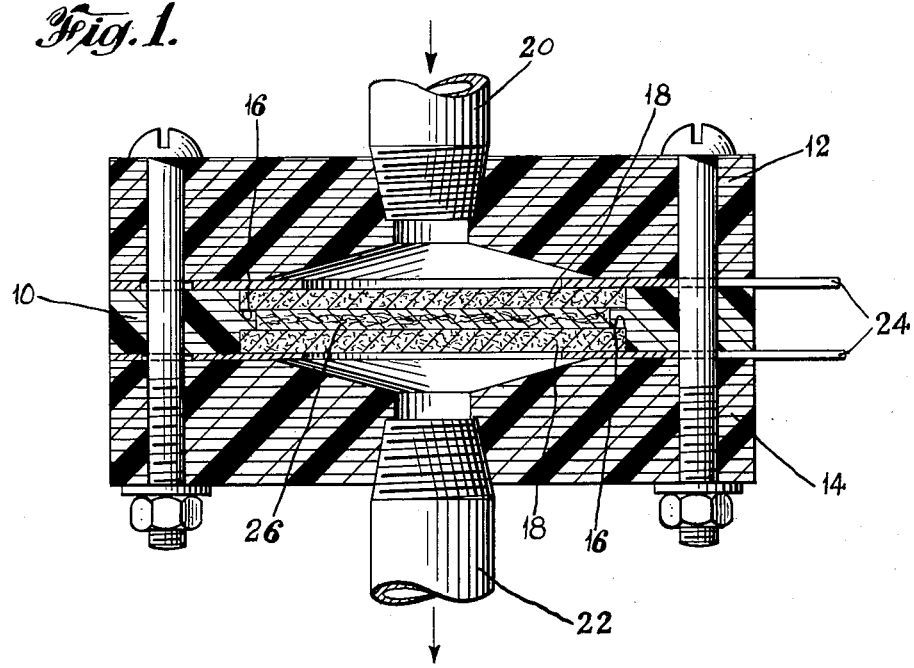
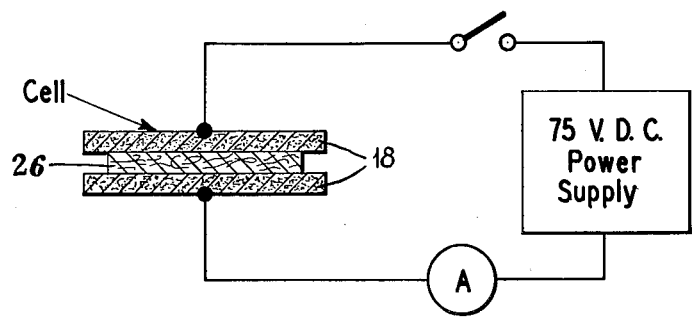
INVENTORS
NORMAN B. BROGAN
HERBERT N. HILL, JR.
FRANKLIN O. SMITH
BY
ATTORNEY

United States Patent Office 2,976,728
Patented Mar. 28, 1961

2,976,728

ELECTROLYTIC MOISTURE MEASURING APPARATUS

Norman B. Brogan, Dunbar, and Herbert N. Hill, Jr., South Charleston, W. Va., and Franklin O. Smith, Los Angeles, Calif., assignors to Union Carbide Corporation, a corporation of New York Filed Jan. 20, 1958, Ser. No. 710,019

7 Claims. (Cl. 73—336.5)

This invention relates to the detection of water in fluids and, more particularly, to an improved detection cell for use in apparatus for detecting parts per million of water in fluid mixtures.

Over the past few years the chemical process industry and the need for increased automation and control have grown hand in hand. Concurrently, those in the instrumentation field have greatly expanded and increased their efforts to keep abreast of new developments.

Indicative of activity in the instrumentation field have been the efforts of many to develop improved apparatus and methods for the detection of very small amounts of water in both gaseous and liquid fluids. Most of these instruments make use of some type of moisture-sensitive material and measure the change in the physical parameters of such material as an indication of the moisture content of the fluid to which it has been exposed. The most commonly used instruments for moisture determination comprise electrodes separated by some type of desiccant. As the desiccant absorbs water its conductance varies and, by measuring the change in conductance, the moisture content is determined.

Sensing elements in use up to this time have most commonly been of two general types:

(1) A probe type element comprising two electrodes, space-wound spirally on a glass rod, with a conducting bridge of desiccant between them over which the gas sample flows;

(2) A conducting layer of desiccant between two wire electrodes which are formed into helices and mounted within a cyindrical tube so that the gas sample flow follows a path similar to that of an ascending spiral.

Much difficulty has been encountered in the use of commercial moisture indicating instruments because of the extremely long recovery times of presently available models. It should be pointed out that by the term "recovery time" is meant that time required for an instrument to revert from a high scale to a low scale reading. "Response time," on the other hand, is that time required to achieve full scale deflection when the sensing element is exposed to water-bearing fluid.

A further difficulty in using these prior sensing elements lies in a certain inherent inaccuracy due to the fact that in no presently available instrument does the sensing element contact all the sample gas. This problem is most pronounced in the probe type element but exists to some extent in others as well.

Another difficulty in prior art devices lies in obtaining reproducibility of response from one instrument to another. This is because the sensitive desiccant used is normally coated on the electrode in the form of a paste, the excess is removed by wiping, and the residue dried in a vacuum oven. This procedure naturally leaves much room for variation.

It is, therefore, the primary object of this invention to provide novel moisture sensing apparatus having fast recovery time.

Further objects of this invention are: to achieve more accurate measurement of moisture content of fluids, to provide a sensing element in which the active material will contact all the measured sample, and to make use of the water sensitive material in dry form thus improving reproducibility of response.

According to the present invention these objects are accomplished by providing a moisture sensing element comprising at least two porous disks of electrically conductive material separated by layers of hygroscopic material, conduit means for passing the sample fluid through the disks and intervening material, and means for measuring the resultant conductance of the material between the disks.

In the drawing:

Fig. 1 is a sectional elevation through a cell embodying the invention, showing the internal cell construction.

Fig. 2 is a schematic drawing of a representative measuring circuit using the cell of the invention.

Referring to Fig. 1 of the drawing, a cell 10 is provided having a body machined from a material such as a plastic, which is essentially electrically insulating and is chemically inert to the fluids to be tested. Top cap 12 and bottom cap 14 may be machined from the same material or from any other suitable material including metals, such as stainless steel. The body member 10 is machined with shoulders 16 to receive and separate the porous electrode disks 18. The disks used may be solid and drilled to provide passages or pores to permit the passage of fluid, they may be woven with openings or pores of any desired size, or they may be unrelieved sintered porous stainless steel disks in which case the fluid may pass through the voids of the disk itself. The latter construction is preferred and will be the one referred to herein below. The top cap 12 and bottom cap 14 are ported and relieved in such a way as to provide retention of the disks and to permit passage of the fluid through the cell. Inlet means 20 and outlet means 22 are, respectively, positioned in these parts. Electrical terminals 24 are provided to make contact with discs 18 and are suitably relieved so as not to impede the sample flow.

The thickness of the sintered disks used may vary over a wide range. It has been found that if response times are critical, the preferred thickness is approximately 0.025 inch. As to recovery time, however, disks as thick as 0.100 inch have been found to be about 10 times better than obtainable in the best commercial instrument.

Upon assembly, the void in the body between the disks is filled with a desiccant 26. The desiccant used may be any hygroscopic material which shows a change in conductance upon the absorption of water. The preferred hygroscopic material, however, is phosphorous pentoxide ($P_2O_5$) in the form of a thin wafer. Specifically, in one embodiment, the wafer consisted of No. 1 filter paper impregnated with desiccant, using a 25 percent by weight solution of phosphorous pentoxide dissolved in ethanol. The ethanol was evaporated, leaving the filter paper impregnated with desiccant. This construction permits the cell to be resensitized rapidly and easily when the need arises by the simple substitution of a new wafer for the old.

In the operation of the preferred embodiment of the cell, wherein sintered stainless steel disks and phosphorous pentoxide desiccant are used, a fluid containing a minute quantity of water is passed through the cell as indicated by the arrows of Fig. 1. The desiccant absorbs water and phosphoric acid is formed as indicated by the equation:

$$P_2O_5 + 3H_2O \rightarrow 2H_3PO_4$$

The cell conductance increases proportionally with the formation of phosphoric acid and, with reference to the circuit of Fig. 2, causes a change in current flow through the ammeter A which is calibrated to indicate the parts per million water content of the sample fluid. It should be noted that the sample fluid passes through the desiccant rather than merely passing over it. In this manner all of the measured fluid is brought into intimate contact with the sensing element, thus greatly improving the accuracy and sensitivity of the instrument.

Simultaneously with the absorption of the water and formation of the phosphoric acid, the voltage existing across the electrodes causes electrolysis of the water from the phosphoric acid to liberate hydrogen and oxygen from the cathode and anode respectively so that the phosphorous pentoxide is regenerated and no replenishing of the desiccant is necessary.

As an example of the great improvement in recovery time of the cell of the invention over those of the prior art, tests were conducted which provided the results set forth below. These tests were conducted on a basis of 20 parts per million of water in nitrogen gas for full scale deflection. Nitrogen containing 20 parts per million water vapor was admitted to the analyzers and, when full scale was reached, was replaced by nitrogen containing 1 to 2 parts per million water vapor. The full scale and recovery times were as follows:

|  | Upscale Time | Recovery Time | |
| --- | --- | --- | --- |
|  |  | 90 Percent | Full |
| Cell of Invention | 30 secs. to 1 min. | ½ hour | 2 hrs. |
| Prior Commercial Cells | 30 secs. to 1 min. | 24 hours | 24 hrs. |

The results of the above tests plainly indicate the great advantages obtainable by use of the cell of this invention over those of the prior art.

It is to be understood that modifications and variations may be effected without departing from the spirit and scope of the invention.

What is claimed is:

1. In moisture content measuring apparatus, a cell comprising a body section, at least two porous electrodes, at least one layer of hygroscopic material which shows a change in conductance upon the absorption of water and which becomes an electrolyte for the electrolysis of absorbed water, an inlet cap, and an outlet cap; means positioned in said body section whereby said hygroscopic material and said porous electrodes are held in alternating, interjacent relationship; inlet means positioned in said inlet cap for the admission of a sample fluid; outlet means positioned in said outlet cap whereby sample fluid entering the cell through the inlet means in the inlet cap and passing through the porous electrodes and hygroscopic material therebetween is expelled from said device; and means for connecting said electrodes to a direct current electrical circuit.

2. In moisture content measuring apparatus, a cell section, at least two porous, woven metal electrodes, at least one layer of hygroscopic material which shows a change in conductance upon the absorption of water and which becomes an electrolyte for the electrolysis of absorbed water, an inlet cap, and an outlet cap; means positioned in said body section whereby said hygroscopic material and said porous, woven metal electrodes are held in alternating interjacent relationship; inlet means positioned in said inlet cap for the admission of a sample fluid; outlet means positioned in said outlet cap whereby sample fluid entering the cell through the inlet means in the inlet cap and passing through the porous, woven electrodes and hygroscopic material therebetween is expelled from said device; and means for connecting said electrodes to a direct current electrical circuit.

3. In moisture content measuring apparatus, a cell comprising a body section, at least two porous electrodes, at least one sheet of moisture sensitive, pervious material impregnated with a hygroscopic material which shows a change in conductance upon the absorption of water and which becomes an electrolyte for the electrolysis of said water, an inlet cap, and an outlet cap; means positioned in said body section whereby said moisture sensitive, pervious sheet and said porous electrodes are held in alternating, interjacent relationship; inlet means positioned in said inlet cap for the admission of a sample fluid; outlet means positioned in said outlet cap whereby said sample fluid entering the cell through the inlet means in the inlet cap and passing through the porous electrodes and sheet of pervious material therebetween is expelled from said device; and means for connecting said electrodes to a direct current electrical circuit.

4. In a moisture content measuring apparatus, a cell comprising at least two spaced, opposing porous disks of electrically conductive material, at least one layer of a hygroscopic material interposed between said disks in electrical contact with each of said disks, said hygroscopic material showing a change in conductance upon the absorption of water and becoming an electrolyte for the electrolysis of said water, and conduit means for passing sample moisture-containing fluid through said porous disks and said hygroscopic material interposed therebetween.

5. The apparatus in accordance with claim 3 wherein the hygroscopic material is phosphorous pentoxide.

6. In series circuit relationship with a current measuring device and a direct current power source, a cell comprising at least two spaced, opposing porous disks of electrically conductive material, at least one layer of a hygroscopic material interposed between said disks in electrical contact with each of said disks, said hygroscopic material showing a change in conductance upon the absorption of water and becoming an electrolyte for the electrolysis of absorbed water, and conduit means for passing sample moisture-containing fluid through said porous disks and said hygroscopic material interposed therebetween.

7. In the method of detecting and measuring the amount of water contained in continuously flowing water-containing fluids having water contents varying with time by passing said water-containing fluid through porous electrode surfaces separated by a water-absorbent material, wherein the electrodes are electrically energized and metered to determine the relative changes in conductance of the water-absorbent material due to the absorption of water, the improvement whereby a fast recovery time of the water-absorbent material is achieved comprising impregnating said water-absorbent material with a hygroscopic material which becomes an electrolyte upon absorbing water and maintaining said electrodes under a direct current potential whereby the water absorbed by the hygroscopic material undergoes electrolysis to hydrogen and oxygen gas, which gases are carried away by the flow of fluid.

References Cited in the file of this patent

UNITED STATES PATENTS

| 2,047,638 | Kott | July 14, 1936 |
| 2,494,769 | Mabey | Jan. 17, 1950 |
| 2,526,636 | Coleman | Oct. 24, 1950 |
| 2,767,574 | Schurch | Oct. 23, 1956 |
| 2,807,956 | Doble | Oct. 1, 1957 |
| 2,917,066 | Bergson | Dec. 15, 1959 |

OTHER REFERENCES

Recent Development in Hygrometry, by Awbery, in Journal of Scientific Instruments, vol. 20, No. 10, 73–355, October 1943.